(12) United States Patent
Liu

(10) Patent No.: US 6,810,151 B2
(45) Date of Patent: Oct. 26, 2004

(54) METHOD OF PERFORMING LENS EFFECT USING TRANSFORM MASK

(75) Inventor: Casper Liu, Taipei (TW)

(73) Assignee: Ulead Systems, Inc., Taipei (TW)

( * ) Notice: Subject to any disclaimer, the term of this patent is extended or adjusted under 35 U.S.C. 154(b) by 585 days.

(21) Appl. No.: 09/985,558

(22) Filed: Nov. 5, 2001

(65) Prior Publication Data

US 2002/0196984 A1 Dec. 26, 2002

(30) Foreign Application Priority Data

Jun. 14, 2001 (TW) .......................................... 90114408 A

(51) Int. Cl.[7] .............................. G06K 9/40; G06K 9/32; G06K 9/36
(52) U.S. Cl. ........................................ 382/275; 382/293
(58) Field of Search ................................. 382/276, 279, 382/283, 289, 254, 260; 349/646, 647

(56) References Cited

U.S. PATENT DOCUMENTS 6,035,075 A * 3/2000 Inoue et al. ................. 382/282
6,271,847 B1 * 8/2001 Shum et al. ................. 345/418
6,281,931 B1 * 8/2001 Tsao et al. ................... 348/247
6,538,691 B1 * 3/2003 Macy et al. ............. 348/222.1

* cited by examiner

Primary Examiner—Jon Chang
Assistant Examiner—Wesley Tucker
(74) Attorney, Agent, or Firm—Birch, Stewart, Kolasch & Birch, LLP

(57) ABSTRACT

A method of performing a lens effect to determine a realistic pixel content of a realistic pixel transformed by a virtual lens from a plurality of image pixels is disclosed. First, an offset mask having an offset value corresponding to a pixel point in the virtual lens is provided, and a plurality of weight masks respectively corresponding to the image pixels are also provided, each of the weight masks having a weight value corresponding to the pixel point. Then, a reference pixel position is calculated by adding a realistic pixel position to the offset value, and one of the image pixels with a position equal to the reference pixel position is selected as a reference pixel. Finally, a weighted process is performed on the addition of an adjacent pixel content and a reference pixel content according to the weight value in a first weight mask of the weight masks, thereby the realistic pixel content of the realistic pixel is acquired.

8 Claims, 5 Drawing Sheets

|   0.4 | 0.3 | 0.3 | 0.3 | 0.4 |
|---|---|---|---|---|
| 0.3 | 0.2 | 0.1 | 0.2 | 0.3 |
| 0.3 | 0.1 | 0   | 0.1 | 0.3 |
| 0.3 | 0.2 | 0.1 | 0.2 | 0.3 |
| 0.4 | 0.3 | 0.3 | 0.3 | 0.4 |

| (0.3,0.2,0.3) | (0.2,0.3,0.3) | (0.2,0.3,0.2) | (0.2,0.3,0.3) | (0.3,0.2,0.3) |
|---|---|---|---|---|
| (0.2,0.3,0.3) | (0.2,0.2,0.1) | (0.1,0.1,0.1) | (0.2,0.1,0.2) | (0.2,0.3,0.3) |
| (0.2,0.3,0.2) | (0.1,0.1,0.1) | (0,0,0) | (0.1,0.1,0.1) | (0.2,0.3,0.2) |
| (0.2,0.3,0.3) | (0.2,0.1,0.2) | (0.1,0.1,0.1) | (0.1,0.2,0.2) | (0.2,0.3,0.3) |
| (0.3,0.2,0.3) | (0.2,0.3,0.3) | (0.2,0.3,0.2) | (0.2,0.3,0.3) | (0.3,0.2,0.3) |

METHOD OF PERFORMING LENS EFFECT USING TRANSFORM MASK

BACKGROUND OF THE INVENTION

1. Field of the Invention

The present invention relates to a lens effect method, and particularly to a lens effect method that speeds up the effect process and performs anti-aliasing using transform mask.

2. Description of the Related Art

Lens effect is an application based on the optical refraction axiom. Lens effect refracts a realistic pixel seen to a reference pixel actually on the image surface, and employs the pixels adjacent to the reference pixel to achieve anti-aliasing on the realistic pixel.

In the technical domain of image processing or animation, lens effect is a basic image effect. In the current process method of lens effect, a system has to calculate each of the pixels covered by a virtual lens in real time according to a transform formula corresponding to the virtual lens to find out the corresponding reference pixels on the image surface.

In addition, after finding out the corresponding reference pixels, the system also needs to calculate the influence of adjacent pixels on the reference pixel in this realistic pixel, and then achieve anti-aliasing according to the influence. However, the system requires a great deal of processing power to handle such a real-time calculation, and if the power is not sufficient a halt of the image process or a non-continuous play of the animation results.

SUMMARY OF THE INVENTION

It is therefore an object of the present invention to provide a lens effect method that speeds up the entire effect process and performs anti-aliasing to alleviate the alias in realistic pixels using transform mask.

To achieve the above object, the present invention provides a method of performing a lens effect to determine a realistic pixel content of a realistic pixel transformed by a virtual lens having a plurality of points from a plurality of image pixels, the realistic pixel corresponding to a pixel point of the points of the virtual lens.

First, an offset mask having an offset value corresponding to the pixel point is provided and a plurality of weight masks respectively corresponding to the image pixels are also provided, each of the weight masks having a weight value corresponding to the pixel point;

Then, a reference pixel position is calculated by adding a realistic pixel position of the realistic pixel with the offset value corresponding to the pixel point in the offset mask, and one of the image pixels with a position equal to the reference pixel position is selected as a reference pixel.

Then, a weighted process is performed on the addition of an adjacent pixel content of an adjacent pixel adjacent to the reference pixel and a reference pixel content of the reference pixel according to the weight value corresponding to the pixel point in a first weight mask of the weight masks, thereby acquiring the realistic pixel content of the realistic pixel.

Finally, the realistic pixel is displayed according to the realistic pixel content.

According to a first embodiment of the present invention, the first weight mask corresponds to the adjacent pixel, and according to a second embodiment of the present invention, the first weight mask corresponds to the reference pixel.

According to the embodiments, the offset mask may be composed of a horizontal mask and a vertical mask. The horizontal mask stores horizontal offset values on the horizontal direction and the vertical mask stores vertical offset values on the vertical direction. In addition, the realistic pixel content, adjacent pixel content, and the reference pixel content include a RGB value (signal).

BRIEF DESCRIPTION OF THE DRAWINGS

The aforementioned objects, features and advantages of this invention will become apparent by referring to the following detailed description of the preferred embodiment with reference to the accompanying drawings, wherein:

FIG. 2a is a schematic diagram showing a lens effect;

FIG. 2b is an example of offset mask corresponding to the lens effect in FIG. 2a;

FIG. 2c is a schematic diagram showing a horizontal mask and a vertical mask forming the offset mask in FIG. 2b;

FIG. 3 is an example of weight mask according to the first embodiment of the present invention;

FIG. 5 is an example of weight mask according to the second embodiment of the present invention.

DETAILED DESCRIPTION OF THE PREFERRED EMBODIMENT

Referring to the accompanying figures, the preferred embodiments of the present invention follow.

First Embodiment

Figure 1:
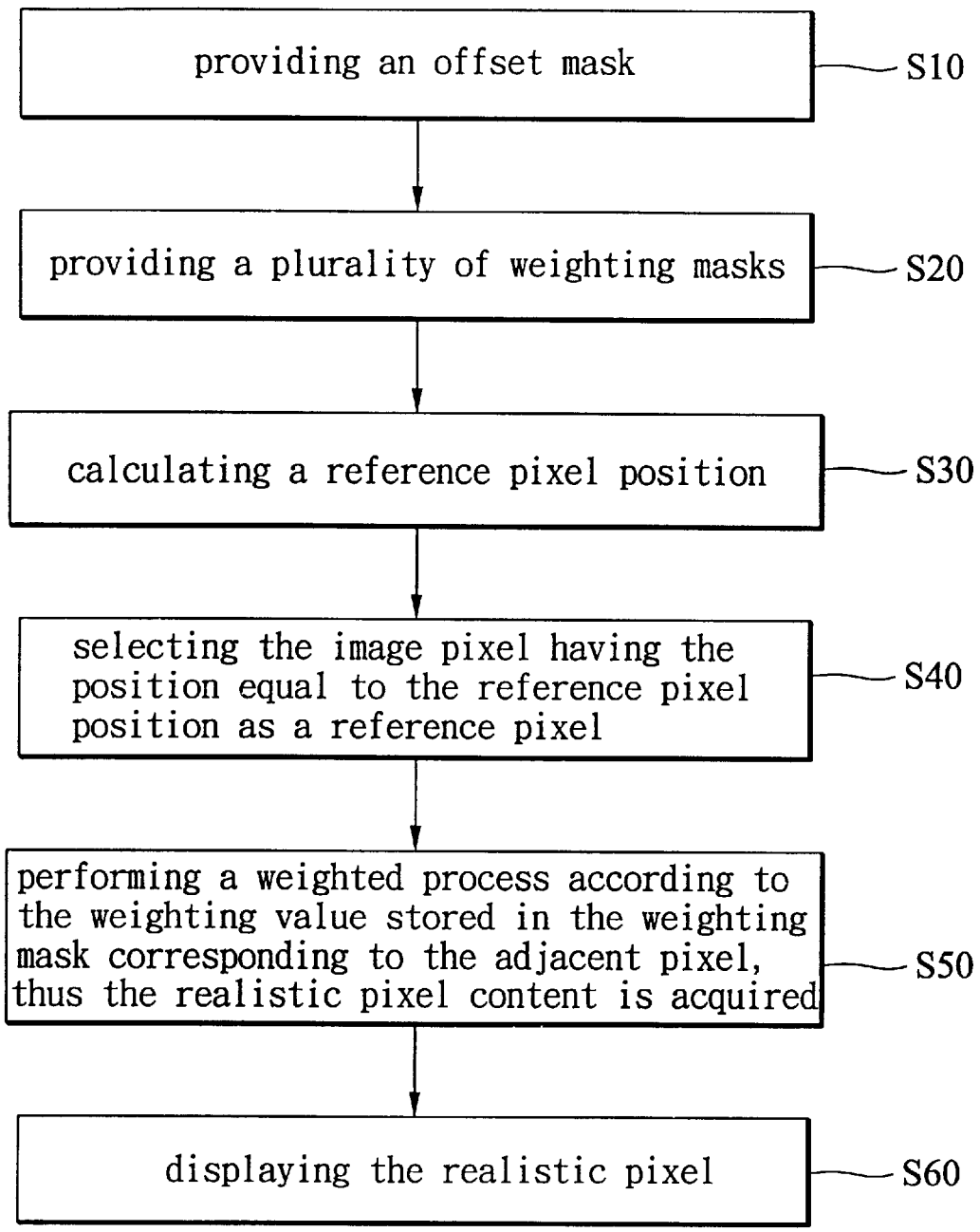
FIG. 1 is a flow chart illustrating the operation of a method of performing a lens effect according to the first embodiment of the present invention.

FIG. 1 shows a flow chart illustrating the operation of a method of performing a lens effect according to the first embodiment of the present invention. Referring to FIG. 1, the first embodiment of the present invention is described as follows.

The first embodiment of the present invention is used to determine a realistic pixel content of a realistic pixel transformed by a virtual lens (lens effect) from several image pixels.

First, in steps S10 and S20, an offset mask and a plurality of weight masks are provided in advance, the number of weight masks is depended on how many adjacent pixels are using to perform anti-aliasing. The size of the offset mask and the weight masks are equal to the virtual lens. The offset mask includes a predetermined number of offset storage elements, and each of the offset storage elements stores an offset value respectively corresponding to one position in the virtual lens. Each of the weight masks includes a predetermined number of weighting storage elements, and each of the weighting storage elements stores a weight value respectively corresponding to one position in the virtual lens.

Figures 2A, 2B, 2C:
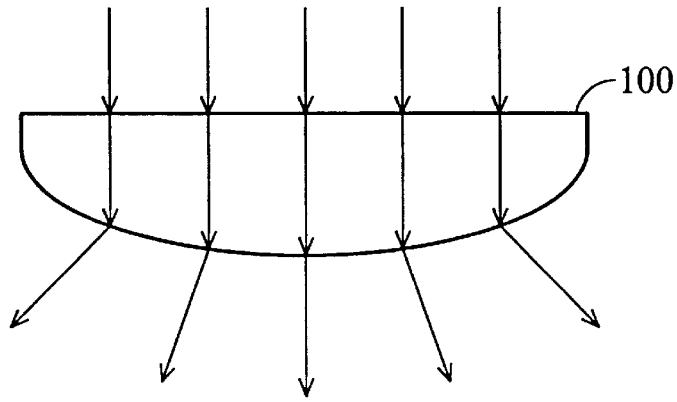

For example, FIG. 2a shows a schematic diagram of a lens effect. The direction of the arrow represents the optical refraction axiom of the light after passing through a virtual lens 100. FIG. 2b shows an example of offset mask 200 corresponding to the lens effect in FIG. 2a, assuming the virtual lens 100 includes 25 elements (that is, the size of virtual lens 100 is 25), then the offset mask 200 may be a matrix having a size of 5×5 (25).

Each of the 25 storage elements corresponds to one position in virtual lens 100, respectively, and each of the storage elements stores an offset value (that is, the skew of the light passing through virtual lens 100) in virtual lens 100. For example, if the data of storage element is (1,−1), it means the light will be refracted to a new position of 1 added to the horizontal direction and 1 subtracted to the vertical direction from an original position.

Furthermore, the offset mask 200 may be composed of a horizontal mask 210 and a vertical mask 220, as shown in FIG. 2c. The horizontal mask 210 stores horizontal offset values on the horizontal direction and the vertical mask 220 stores vertical offset values on the vertical direction.

In addition, FIG. 3 shows an example of weight mask 300 according to the first embodiment of the present invention, in which the weight mask 300 may be a matrix having a size equal to the offset mask 200 and virtual lens 100, and the weight mask 300 corresponds to one of the image pixels. Since the light may be refracted to a position among several image pixels, the weight mask 300 stores the different probability of the light as refracted through a different position in virtual lens 100 to the image pixel.

It should be noted that, since the virtual lens is determined in advance, the offset mask, horizontal mask, vertical mask, and each of the weight masks respectively corresponding to image pixels can be also calculated in advance.

Then, in step S30, a realistic pixel position of the realistic pixel is processed on the basis of the offset mask. That is, the realistic pixel position and the offset value stored in the offset storage element corresponding to the position of the realistic pixel are added, thus a reference pixel position is obtained.

Then, in step S40, the image pixel with a position equal to the reference pixel position is selected as a reference pixel. Thereafter, in step S50, a weighted process is performed on at least one adjacent pixel content of a adjacent pixel adjacent to the reference pixel and a reference pixel content of the reference pixel according to the weight value stored in the weighting storage element corresponding to the position of the realistic pixel of the weight mask corresponding to the adjacent pixel, thus the realistic pixel content of the realistic pixel is acquired. The realistic pixel content, adjacent pixel content, and the reference pixel content can be represented with a RGB value (signal).

For example, assuming only one adjacent pixel is considered and the weight value stored in the weighting storage element corresponding to the position of the realistic pixel of the weight mask corresponding to the adjacent pixel is 0.5, then realistic pixel content=0.5× adjacent pixel content+(1−0.5)× reference pixel content Finally, in step S60, the realistic pixel is displayed according to the realistic pixel content.

Next, referring to FIG. 2a, 2b, 2c, and 3, an example will be described. Assume the realistic pixel position of the realistic pixel is (70,50)(horizontal direction/vertical direction) and the position corresponding to the realistic pixel in virtual lens 100 is (4,3), then the obtained reference pixel position is (71,50)(Since the offset value stored in storage element (4,3) of offset mask 200 is (1,0)).

Besides, assume three adjacent pixels are considered and the weight masks of three adjacent pixels are the same as weight mask 300 shown in FIG. 3, then realistic pixel content = 0.1 × adjacent pixel content (72, 50) +

0.1 × adjacent pixel content (72, 51) +

0.1 × adjacent pixel content (71, 51) +

(1 − 0.1 − 0.1 − 0.1) × reference pixel content (71, 50)

Therefore, the realistic pixel can be displayed according to the result of weighted process (realistic pixel content).

Second Embodiment

Figure 4:
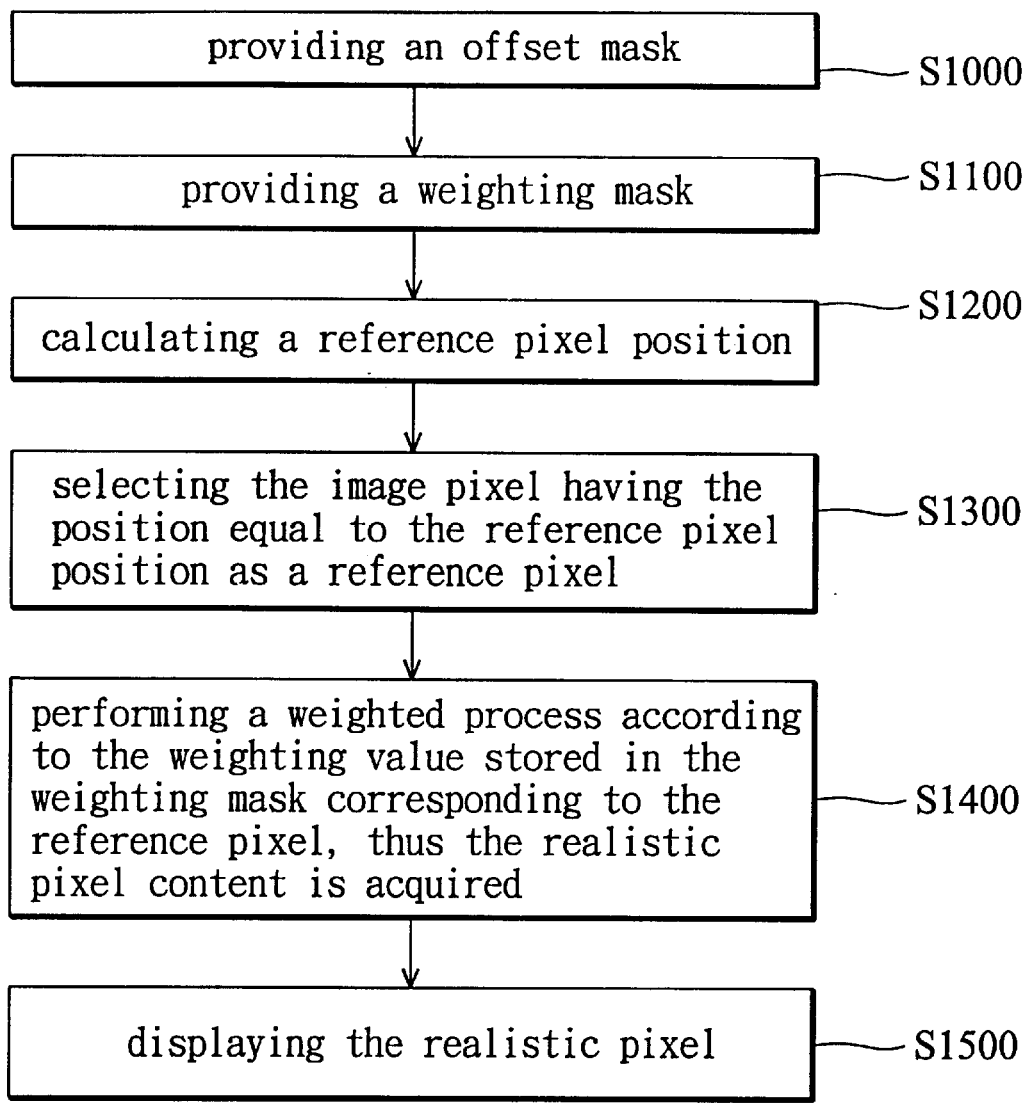
FIG. 4 is a flow chart illustrating the operation of a method of performing a lens effect according to the second embodiment of the present invention.

FIG. 4 shows a flow chart illustrating the operation of a method of performing a lens effect according to the second embodiment of the present invention. Referring to FIG. 4, the second embodiment of the present invention is described as follows.

The second embodiment of the present invention determines a realistic pixel content of a realistic pixel transformed by a virtual lens (lens effect) from several image pixels.

First, in step S1000, an offset mask is provided in advance, wherein the size of the offset mask is equal to the virtual lens. The offset mask includes a predetermined number of offset storage elements, and each of the offset storage elements stores an offset value respectively corresponding to a position in the virtual lens.

Then, in step S1100, a weight mask is also provided (described later) in advance. The weight mask includes a predetermined number of weighting storage elements, and each of the weighting storage elements stores at least one weight value of a adjacent pixel corresponding to one position in the virtual lens.

FIG. 5 shows an example of weight mask 400 according to the second embodiment of the present invention, the weight mask 400 may be a matrix having a size equal to the offset mask 200 in FIG. 2b and virtual lens 100 in FIG. 2a, and the weight mask 400 corresponds to an image pixel. The weight mask 400 store the different probability of the light as refracted through a different position in virtual lens 100 to the adjacent pixels adjacent to the image pixel.

It should be noted that, since the virtual lens is determined in advance, each of the weight masks respectively corresponding to image pixels can be calculated in advance.

Then, in step S1200, a realistic pixel position of the realistic pixel is processed on the basis of the offset mask. that is, the realistic pixel position and the offset value stored in the offset storage element corresponding to the position of the realistic pixel are added, thus a reference pixel position is obtained.

Then, instep S1300, the image pixel that its position equal to the reference pixel position is selected as a reference pixel. Thereafter, in step S1400, a weighted process is performed on at least one adjacent pixel content of a adjacent pixel adjacent to the reference pixel and a reference pixel content of the reference pixel according to the weight value of the adjacent pixel, stored in the weighting storage element corresponding to the position of the realistic pixel of the weight mask corresponding to the reference pixel, thus the realistic pixel content of the realistic pixel is obtained. The realistic pixel content, adjacent pixel content, and the reference pixel content can be represented with a RGB value (signal).

Finally, in step S1500, the realistic pixel is displayed according to the realistic pixel content.

Next, referring to FIGS. 2a, 2b, 2c, and 5 again, an example will be described. Assume the realistic pixel position of the realistic pixel is (60,40)(horizontal direction/ vertical direction) and the position corresponding to the realistic pixel in virtual lens 100 is (4,4), then the obtained reference pixel position is (61,41) (Since the offset stored in storage element (4,4) of offset mask 200 is (1,1)).

Additionally, assuming three adjacent pixels are considered and the weight mask of the reference pixel (61,41) is the weight mask 400 shown in FIG. 5, we can find the weight value stored in the weighting storage element (4,4) of the weight mask 400 is (0.1,0.2,0.2), as an example, the data sequence of the weight value is the weighting of the adjacent pixel positioning adding one in the horizontal direction, one in the horizontal direction and added one in the vertical direction, and one in the vertical direction from the original position. Then the realistic pixel content after weighting process can be indicated as realistic pixel content = 0.1 × adjacent pixel content (62, 41) +

0.2 × adjacent pixel content (62, 42) +

0.2 × adjacent pixel content (61, 42) +

(1 − 0.1 − 0.2 − 0.2) × reference pixel content (61, 41)

Therefore, the realistic pixel can be displayed according to the result of weighted process (realistic pixel content).

The difference the first and second embodiments of the present invention is that the weight mask 300 corresponding to an image pixel in the first embodiment stores the different probability of the light as refracted through a different position in virtual lens to the image pixel, and the weight mask 400 corresponding to an image pixel in the second embodiment stores the different probability of the light as refracted through a different position in virtual lens to the adjacent pixels adjacent to the image pixel.

As a result, using the method of performing a lens effect according to the present invention can significantly speed up the response time of the lens effect and perform anti-aliasing to alleviate the alias in realistic pixels, in addition, the present invention is also helpful in reducing the consumption of system resources.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A method of performing a lens effect to determine a realistic pixel content of a realistic pixel transformed by a virtual lens having a plurality of points from a plurality of image pixels, the realistic pixel corresponding to a pixel point of the points of the virtual lens, comprising the steps of:

providing an offset mask having an offset value corresponding to the pixel point;

providing a plurality of weight masks corresponding to the image pixels, respectively, each of the weight masks having a weight value corresponding to the pixel point;

calculating a reference pixel position by adding a realistic pixel position of the realistic pixel with the offset value corresponding to the pixel point in the offset mask;

selecting one of the image pixels with a position equal to the reference pixel position as a reference pixel; and performing a weighted process on the addition of an adjacent pixel content of an adjacent pixel adjacent to the reference pixel and a reference pixel content of the reference pixel according to the weight value corresponding to the pixel point in a first weight mask of the weight masks, thereby acquiring the realistic pixel content of the realistic pixel.

2. The method as claimed in claim 1 further comprising a step displaying the realistic pixel according to the realistic pixel content.

3. The method as claimed in claim 1 wherein the offset mask is composed of a horizontal mask for storing horizontal offset values on the horizontal direction and a vertical mask for storing vertical offset values on the vertical direction.

4. The method as claimed in claim 1 wherein the realistic pixel content includes a RGB value (signal).

5. The method as claimed in claim 1 wherein the adjacent pixel content includes a RGB value (signal).

6. The method as claimed in claim 1 wherein the reference pixel content includes a RGB value (signal).

7. The method as claimed in claim 1 wherein the first weight mask corresponds to the adjacent pixel.

8. The method as claimed in claim 1 wherein the first weight mask corresponds to the reference pixel.

* * * * *